(12) United States Patent
Tchapian et al.

(10) Patent No.: US 7,235,282 B2
(45) Date of Patent: Jun. 26, 2007

(54) METHOD OF TREATING THE SURFACE OF AN AGED PVC OBJECT

(75) Inventors: Michel Tchapian, Brussels (BE); Xavier Coudry, Dijon (FR); Pierre Lomenech, Dole (FR); Patrick Charles, Braine-le-Chateau (BE); Richard Thommeret, Brussels (BE)

(73) Assignee: Solvay (Societe Anonyme), Brussels (BE)

(*) Notice: Subject to any disclaimer, the term of this patent is extended or adjusted under 35 U.S.C. 154(b) by 31 days.

(21) Appl. No.: 10/489,679

(22) PCT Filed: Sep. 18, 2002

(86) PCT No.: PCT/EP02/10520

§ 371 (c)(1),
(2), (4) Date: Mar. 16, 2004

(87) PCT Pub. No.: WO03/025050

PCT Pub. Date: Mar. 27, 2003

(65) Prior Publication Data

US 2004/0234700 A1    Nov. 25, 2004

(30) Foreign Application Priority Data

Sep. 18, 2001  (FR)  ................................. 01 12116

(51) Int. Cl.
*B05D 7/02* (2006.01)
*B05D 1/02* (2006.01)
*B05D 1/36* (2006.01)

(52) U.S. Cl. ................. 427/412.4; 427/307; 427/427.7
(58) Field of Classification Search ............. 427/407.1, 427/307, 412.4, 427.7
See application file for complete search history.

(56) References Cited

U.S. PATENT DOCUMENTS

| 5,447,789 A | * | 9/1995 | Griffin ..................... 428/308.4 |
| 6,548,561 B1 | * | 4/2003 | Muller et al. .............. 521/46.5 |
| 2003/0176544 A1 | * | 9/2003 | Hawrylko et al. .......... 524/180 |

FOREIGN PATENT DOCUMENTS

| EP | 0 306 006 | | 3/1989 |
| EP | 0 306 06 A2 | * | 3/1989 |
| FR | 933843 | * | 9/1946 |
| FR | 933 843 | | 5/1948 |
| FR | 936 804 | | 7/1948 |
| WO | WO 00/10787 A1 | * | 3/2000 |

OTHER PUBLICATIONS

Lemaire et al., "Confirming Pinking Mechanism for PVC Profiles in Mild Climactic Conditions," Journal of Vinyl & Additive Technology, Jun. 2003, vol. 9, No. 2, pp. 54-60.*
Turnbull et al., "Accelerated Weathering of UPVC," Journal of Materials Science 32 (1997) 2313-2327.*
CRC Handbook of Chemistry and Physics, CRC Press, Inc., 1983-1984 64th Edition, p. C696.

* cited by examiner

*Primary Examiner*—William Phillip Fletcher, III
(74) *Attorney, Agent, or Firm*—Oblon, Spivak, McClelland, Maier & Neustadt, P.C.

(57) ABSTRACT

A process for the treatment of natural discoloration in an article, particularly a vinyl chloride polymer article, by treating the surface of the article in ambient air with a first organic solution containing an organic peroxide and a first organic solvent. The invention process is particularly useful for vinyl chloride-based articles that have undergone pinking.

21 Claims, No Drawings

METHOD OF TREATING THE SURFACE OF AN AGED PVC OBJECT

The present invention relates to a process for the treatment of articles made of a polymer composition comprising a vinyl chloride polymer which have naturally surface aged.

It is known that the colouring of the surface of old articles made of a polymer composition comprising a vinyl chloride polymer which, during their use, have been exposed to or brought into contact with a source of decomposition, such as heat, cold, artificial light, sunlight, darkness, rain, fog, ambient atmospheric humidity, a solvent solution or a detergent solution, can naturally age, substantially changing with respect to the coloration possessed by the surface of the new articles.

In particular, it is known that the surface, initially white, of old articles, in particular of old profiles, made of a polymer composition comprising a vinyl chloride polymer and titanium dioxide, subjected to the action of sunlight, can change to yellow, red, pink or brown.

The change in the coloration results from the decomposition of the vinyl chloride polymer according to complex and obscure mechanisms which depend not only on the nature and on the strength of the sources of decomposition but also on the nature and on the amounts of each of the substances present in the polymer composition, in particular titanium dioxide.

A well known case is the change to a coloration with pink as the dominant colour of the surface, initially white, of old profiles made of a polymer composition comprising a vinyl chloride polymer and titanium dioxide. This phenomenon, known under the name of "pinking", is often observed on old profiles which have not yet attained their standard lifetime (namely, at least 10 years) but which have been exposed to sunlight under conditions of low insolation and of high humidity. When such climatic conditions are encountered in a given geographical region, pinking can affect a high percentage of the profiles which have been installed in this region.

Attempts have already been made to overcome the problem of change in the coloration of the surface of naturally aged articles, in particular the problem of the pinking of profiles, by repainting the surface. There are a number of disadvantages to this solution. First of all, the decomposed polymer is neither "repaired" nor. removed from the articles. Subsequently, it is not possible to guarantee the stability of the coloration of the painted articles. Finally, the latter are embrittled by the paint itself.

Attempts have also already been made to solve this problem by abrading the layer of the articles where the coloration has been damaged by natural ageing and by then repolishing the articles. This process is expensive in manpower. It is difficult to apply in the corners and over the casings in the vicinity of the walls. Its high-quality implementation requires keen personnel. Furthermore, the resistance to ageing of the abraded and repolished articles is mediocre.

In fact, the only reliable means known for overcoming the problem of articles which have naturally surface aged is their replacement pure and simple. This operation entails a significant outlay. In addition, the fact of having to prematurely replace PVC articles is harmful to its image, very particularly in applications where a long lifetime is often required, as is the case in the field of construction.

An aim of the present invention is to provide a process which makes it possible to restore the coloration of the surface of articles which have naturally surface aged and which exhibits numerous advantages with respect to the processes of the prior art, without exhibiting the disadvantages thereof.

To this end, the invention relates to a process for the treatment of articles made of a polymer composition comprising a vinyl chloride polymer which have naturally surface aged, which comprises a stage (E) according to which the surface of the articles is treated in ambient air with an organic solution comprising an organic peroxide and an organic solvent (solution (S)).

Advantageously, the solution (S) additionally comprises a UV stabilizer, or the process according to the invention additionally comprises a stage (E'), subsequent to stage (E), according to which the surface of the articles is treated with an organic solution, different from the solution (S), which comprises a UV stabilizer and an organic solvent (solution (S')). The term "UV stabilizer" is intended to denote an agent which protects from ultraviolet radiation.

Preferably, the process according to the invention comprises, apart from stage (E), stage (E').

The articles treated by the process according to the invention are advantageously formed, processed, finished or semi-finished articles. They are neither compositions, nor powders, nor granules.

Mention may be made, as examples of articles which can be treated by the process according to the invention, of pipes and fittings (rigid or flexible), cables (flexible), films and sheets (rigid or flexible), coated fabrics (flexible), profiles (rigid or flexible), sheeting (rigid), bottles and flasks (rigid), injected articles (rigid), floor coverings and wall coverings (flexible), mastics (flexible), moulded articles (flexible) and toughened articles (flexible).

The process according to the invention is particularly well suited to the treatment of sheeting and profiles. It is very particularly well suited to the treatment of profiles.

Mention may be made, as examples of profiles, of profiles as such and profiles assembled for the manufacture of finished articles such as doors (including garage doors), window frames, shutters (such as folding shutters and louvered shutters), wall coverings, fences and furniture profiles.

The description of an article as "naturally surface aged" is understood to mean that it is an old article, the surface of which has, during the use of the article, been exposed to or brought into contact with a source of decomposition, such as heat, cold, artificial light, sunlight, darkness, rain, fog, ambient atmospheric humidity, a solvent solution or a detergent solution.

The process according to the invention is particularly well suited to the treatment of naturally surface-aged articles which have been subjected to specific conditions of exposure as explained below.

Firstly, the process according to the invention is particularly well suited to the treatment of articles which have naturally surface aged by intermittent exposure of at least a part of their surface to direct sunlight. It is very particularly suitable when the intermittent exposure to direct sunlight has taken place for at least a period of a year such that the duration of the insolation has been less than or equal to 2000 hours. It excels when the intermittent exposure has taken place for at least a period of a year such that the duration of the insolation has been less than or equal to 1500 hours.

Secondly, the process according to the invention is particularly well suited to the treatment of articles which have naturally surface aged by bringing at least a part of the surface into contact with water or with air having a relative humidity of greater than 50%, for at least a period of a year.

The process according to the invention is particularly well suited to the treatment of articles which have naturally surface aged with the specific consequence with respect to their appearance as explained below.

The process according to the invention is particularly well suited to the treatment of articles which have naturally surface aged, in that at least a part of their surface has a different coloration from that which the same part of the said articles had when they were new, immediately after having been processed.

The term "different coloration" is understood to mean that the overall calorimetric difference in the CIELAB® space (1976):

$$\Delta E_{ab}^* = \sqrt{(L^*_v - L^*_n)^2 + (a^*_v - a^*_n)^2 + (b^*_v - b^*_n)^2}$$

between the coloration of the part of the surface which has aged and that of the same part when the article was new is greater than 1; $L^*$ is the luminance, $a^*$ is the chromaticity along the green-red axis and $b^*$ is the chromaticity along the yellow-blue axis; the index v under $L^*$, $a^*$ and $b^*$ refers to the part of the surface which has aged, while the index n refers to the same part when the object was new.

The process according to the invention is very particularly well suited to the treatment of articles which have naturally surface aged, in that at least a part of their surface, which was white when these articles were new, has acquired a coloration with yellow, pink, red, brown or grey as the dominant colour. The process according to the invention excels in the treatment of articles which have naturally surface aged, in that at least a part of their surface, which was white when these articles were new, has acquired a coloration with pink as the dominant colour, that is to say such that the difference between the pink index PI, defined as being equal to $100 \times (a^* + 0.5 \times b^*)/L^*$, of the surface which was white when these articles were new and the pink index PI of the surface which has acquired a coloration with pink as the dominant colour after natural ageing is greater than 1; $L^*$, $a^*$ and $b^*$ such as defined above.

The polymer composition from which the articles treated by the process according to the invention were manufactured can be any composition comprising a vinyl chloride polymer.

The term "vinyl chloride polymer" is understood to denote both a homopolymer of vinyl chloride and a copolymer having at least 50% by weight of —$CH_2$—$CHCl$— units formed by vinyl chloride with at least one ethylenically unsaturated monomer other than vinyl chloride.

Mention may be made, as examples of ethylenically unsaturated monomers other than vinyl chloride, of fluorovinyl monomers, such as vinylidene fluoride, vinyl esters, such as vinyl acetate, acrylic and methacrylic monomers, such as n-butyl acrylate, styrene monomers, such as styrene, or olefin monomers, such as ethylene, propylene and butadiene.

The vinyl chloride polymer preferably has at least 70% by weight of —$CH_2$—$CHCl$— units and particularly preferably at least 85% by weight of —$CH_2$—$CHCl$— units.

The process according to the invention is particularly well suited to the treatment of articles made of a polymer composition which comprises, in addition to a vinyl chloride polymer, titanium dioxide. The latter can be in the anatase or rutile form. The process according to the invention is very particularly well suited when the titanium dioxide is in the rutile form. The process according to the invention excels when the titanium dioxide is in the rutile form and is coated.

The weight of titanium dioxide with respect to the weight of vinyl chloride polymer advantageously has a value of at least 0.5% and preferably of at least 1%. In addition, it advantageously has a value of at most 20% and preferably of at most 10%.

The process according to the invention is very particularly well suited to the treatment of articles made of a polymer composition which comprises, in addition to a vinyl chloride polymer and titanium dioxide, a heat stabilizer.

Mention may be made, as examples of heat stabilizer, of organic or inorganic salts of tin, of barium, of calcium, of cadmium, of zinc and of lead, and the oxides and hydroxides of these metals.

The process according to the invention is very particularly well suited when the heat stabilizer is chosen from heat stabilizers which comprise lead.

Mention may be made, as examples of heat stabilizers which comprise lead, of basic lead carbonate ($2PbCO_3 \cdot Pb(OH)_2$), dibasic lead phosphate ($2PbO \cdot PbHPO_3 \cdot \frac{1}{2}H_2O$), lead stearate ($Pb(C_{17}H_{35}COO)_2$) and dibasic lead stearate ($2PbO \cdot Pb(C_{17}H_{35}COO)_2$).

The weight of heat stabilizer with respect to the weight of vinyl chloride polymer advantageously has a value of at least 0.5% and preferably of at least 1%. In addition, the weight of heat stabilizer with respect to the weight of vinyl chloride polymer advantageously has a value of at most 20%, preferably of at most 15% and very particularly preferably of at most 10%.

The polymer composition can in particular comprise, in addition to the abovementioned components, conventional additives for polymer compositions, such as plasticizers, impact reinforcers, fillers, pigments other than titanium dioxide, internal lubricants, external lubricants, diluents, viscosity regulators, foaming agents, fungicides or bactericides. The polymer composition preferably comprises at least 150% by weight, with respect to the weight of vinyl chloride polymer, of such additives. In a particularly preferred way, it comprises at most 50% by weight thereof and, in a very particularly preferred way, it comprises at most 20% by weight thereof.

Advantageously, before stage (E), the surface of the articles is cleaned, for example by dusting it with a cloth and/or by washing it with soapy water.

The treatment at stage (E) advantageously consists in diffusing the solution (S) into the surface layer of the articles.

Mention may be made, as examples of such a treatment, inter alia, of:
steeping the surface of the articles in a bath containing the solution (S);
sprinkling the surface of the articles with the solution (S);
spraying the solution (S) over the surface of the articles;
coating the surface of the articles with the solution (S).

In addition, advantageously, the treatment in stage (E) does not consist in diffusing the solution (S) as far as the very bottom of the articles. In particular, if the treatment in stage (E) consists in steeping the surface of the articles in a bath containing the solution (S), the articles are advantageously removed from the bath before the solution (S) has diffused as far as the very bottom of the articles.

The treatment in stage (E) preferably consists in coating the surface of the articles with the solution The coating of the surface of the articles with the solution (S) can be carried out by movements in a single direction or by to-and-fro movements. In addition, it is advantageously carried out without forcibly rubbing the surface.

The rate of progression of the front separating the treated surface from the untreated surface is advantageously less than 100 mm/s and preferably less than 50 mm/s. In addition, the rate of progression of the front separating the treated surface from the untreated surface is advantageously greater than 1 mm/s and preferably greater than 5 mm/s.

The coating of the surface of the articles with the solution (S) can be carried out by any appropriate means, for example with a brush or a cloth, which can be made of cotton or of any other appropriate material. Preferably, it is carried out with a cloth.

When the shape of the articles to be treated allows it, the cloth can be attached to a coating tool. The latter advantageously comprises a stiff pad, which supports the cloth, and a handle.

The treatment in stage (E) is advantageously carried out over the whole of the surface of the articles which has been exposed to a source of decomposition or has been brought into contact with such a source. This applies even if only part of the exposed surface has a different coloration from that which the surface of the articles had when they were new, immediately after having been processed. By way of example, if the articles are window frames, their external face has advantageously been exposed in its entirety to sunlight; the treatment at stage (E) is then advantageously carried out over the whole of the external face of these frames, even if only a part of this external face exhibits a detrimental change in the coloration, Stage (E) is advantageously carried out at least until all the surface to be treated is wetted by the solution (S). When the surface of the aged articles has a different coloration from that which the surface of the new articles had, stage (E) is preferably carried out at least until the restoration of the colouration of all of the surface of the said articles; in a particularly preferred way, stage (E) is carried out at least until the stable restoration of the coloration of at least a part of the surface of these articles. The term "stable restoration of the coloration" is intended to indicate that the latter does not change in the half hour which follows the end of stage (E).

It may be necessary to apply the treatment with the solution (S) several times in succession in order to restore the coloration in a stable way, stubborn stains being capable in particular of appearing in the 10 minutes which follow the treatment. It is rarely necessary to apply more than 4 successive treatments with the solution (S) to restore the coloration in a stable way. Between these treatments, the articles are advantageously left standing for at least 1 minute.

The temperature of the ambient air in which the surface of the articles is treated with the solution (S) is advantageously less than 40° C., preferably less than 35° C. and in a particularly preferred way less than 30° C. In addition, it is advantageously greater than 0° C., preferably greater than 10° C. and in a particularly preferred way greater than 15° C.

The solution (S) can be any organic solution which comprises an organic peroxide and an organic solvent it can be prepared in any way whatever, using in particular any mixing, disolving and phase separating technique.

The concentration of organic peroxide in the solution (S), expressed in grams per kilo of solution, advantageously has a value of at least 2, preferably of at least 5 and in a particularly preferred way of at least 10. In addition, it advantageously has a value of at most 500, preferably of at most 200 and in a particularly preferred way of at most 100.

The weight of organic peroxide which is retained at the surface of or inside the articles immediately after the treatment with the solution (S) has been carried out, expressed in grams per $m^2$, advantageously has a value of at least 0.1, preferably of at least 1 and in a particularly preferred way at least 5. In addition, it advantageously has a value of at most 1000, preferably of at most 200 and in a particularly preferred way of at most 100.

The organic peroxide is advantageously chosen from diacyl peroxide, such as dibenabyl peroxide, peresters, such as tert-butyl perbenzoate, perketals, such as 2,2-bis[t-butylperoxy]butane, dia(ra)lkyl peroxides, such as di(t-butyl) peroxide and dicruwl peroxide, a(ra)lkyl hydroperoxides, such as tert-butyl hydroperoxide and cumene hydroperoxide, or organic peracids and their sodium, potassium and ammonium salts.

Preferably, the organic peroxide is chosen from organic peracids and their sodium, potassium and ammonium salts. In a particularly preferred way, the organic peroxide is an organic peracid.

Mention may be made, as examples of organic peracids, of;

aliphatic monoperacids, such as performic acid, peracetic acid, perpropionic acid, perbutyric acid, pervaleric acid, percaproic acid and percaprylic acid, which can optionally be substituted by an —$OCH_3$ group, such as permethoxy-acetic acid, by an —OH group, such as perlactic acid, by a —Cl group, such as perchloroacetic acid, by an —$NO_2$ group, such as pernitropropionic acid, or by any other group;

ethylenically unsaturated monoperacids, such as peracrylic acid;

aromatic monoperacids, such as perbenzoic acid, optionally substituted by a group such as —$OCH_3$, —OH, —Cl or —$NO_2$;

aliphatic diperacids, such as peroxalic acid, permalonic acid, persuccinic acid, perglutaric acid, peradipic acid, persebaric acid and diperdodecanedioic acid;

aromatic diperacids, such as perphthalic acid, optionally substituted by a group such as —$OCH_3$, —OH, —Cl or —$NO_2$;

polyperacids, such as nitrilotriperacetic acid and percitric acid.

A first preferred characteristic of the organic peracid is that it is aliphatic.

A second preferred characteristic of the organic peracid is that it is a monoperacid.

A third preferred characteristic of the organic peracid is that it has at most 10 carbon atoms. In a particularly preferred way, it has at most 6 carbon atoms and in a very particularly preferred way it has at most 3 carbon atoms.

Of all the organic peracids, peracetic acid is preferred.

When the organic peroxide is an organic peracid, the solution (S) advantageously comprises an organic acid, in addition to the organic peracid and the organic solvent. The concentration of organic acid in the solution (S), expressed in grams per kilo of solution, preferably has a value of at least 2, in a particularly preferred way of at least 10 and in a very particularly preferred way of at least 20. In addition, it preferably has a value of at most 200, in a particularly preferred way of at most 100.

The organic acid advantageously has the same chemical formula as the organic peracid, except that any percarboxyl group of the peracid is substituted by a carboxyl group.

When the solution (S) comprises an organic acid, in addition to the organic peracid and the organic solvent, the solution is advantageously prepared by successively carrying out the following operations (method (M));

the organic solvent is mixed with an aqueous solution comprising the organic peracid, in a proportion of at most 250 g/kg of aqueous solution, the organic acid, in a proportion of at most 500 g/kg of aqueous solution, hydrogen peroxide, in a proportion of at most 250 g/kg of aqueous solution, and water, until a two-phase mixture comprising an organic phase and an aqueous phase is formed;

the organic phase and the aqueous phase are separated;

the organic phase is recovered, which organic phase constitutes the said solution (S).

The concentration of organic peracid in the aqueous solution, expressed in grams per kilo of aqueous solution, preferably has a value of at most 200. In addition, it advantageously has a value of at least 50 and preferably of at least 100.

The concentration of organic acid in the aqueous solution, expressed in grams per kilo or aqueous solution, preferably has a value of at most 400. In addition, it advantageously has a value of at least 100 and preferably of at least 200.

The concentration of hydrogen peroxide in aqueous solution, expressed in grams per kilo of aqueous solution, preferably has a value of at most 200. In addition, it advantageously has a value of at least 50 and preferably of at least 100.

The volume of the organic solvent, with respect to the volume of the aqueous solution, advantageously has a value of at most 20, preferably of at most 10 and in a particularly preferred way of at most 6. In addition, it advantageously has a value of at least ¼, preferably of at least 1 and in a particularly preferred way of at least ⅔.

The preparation according to the method (X) is advantageously carried out at ambient temperature.

The organic solvent which the solution (S) comprises is advantageously an agent which results in the swelling of vinyl chloride polymers.

Agents which result in the swelling of vinyl chloride polymers can be found in particular among alcohols, aldehydes, ketones, monoesters, diasters, athers, aliphatic hydrocarbons, aromatic hydrocarbons, brominated hydrocarbons and chlorinated hydrocarbons. Mention may be made, as examples of such agents which result in the swelling of vinyl chloride polymers, of cyclohexanone, acetone, methyl acetate, tetrahydrofuran, 1,4-dioxane, benzene and chlorinated hydrocarbons, such as dichloromethane, chloroform, 1,1-dichloroethane, 1,1,2-trichloroethane, 1,1,2,2-tetrachloroethane,-trichloroethylene, porchloroethylene and chlorbenz.

A first preferred characteristic of the organic solvent is that it has a solubility parameter δ which has a value of at least 8.5. In a particularly preferred way, δ has a value of at least 9.0. In a very particularly preferred way, δ has a value of at least 9.5. δ is the solubility parameter of the organic solvent as defined in "Handbook of Chemistry and Physics", CRC Press, 64th edition, page C-696. It is expressed in Hildebrand units (H). Tables of values of δ (in H) are available in this same publication.

A second preferred characteristic of the organic solvent is that it has a solubility parameter δ which has a value of at most 10.5. In a particularly preferred way, δ has a value of at most 10.0.

A third preferred characteristic of the organic solvent is that it is chosen from ketones, monoesters, ethers, aromatic hydrocarbons, brominated hydrocarbons and chlorinated hydrocarbons. In a particularly preferred way, it is chosen from chlorinated hydrocarbons and in a very particularly preferred way from $C_1$ chlorinated hydrocarbons.

Of all the organic solvents which have been used to prepare the solution (S), that which has given the best results is dichloromethane.

The concentration of organic solvent in the solution (S), expressed in grams per kilo of solution, advantageously has a value of at least 500, preferably of at least 650 and in a particularly preferred way of at least 800. In addition, it advantageously has a value of at most 990 and preferably of at most 970.

When the solution (S) comprises a UV stabilizer, the latter is advantageously chosen from Uv stabilizers which withstand the oxidizing effect of organic peroxides.

UV stabilizers which withstand the oxidizing effect of organic peroxides can be found in particular among complexing agents, such as nickel(II) complexes and organic phosphites, and among UV screening agents. The term "UV screening agent" is intended to denote an agent which absorbs ultraviolet radiation. The UV screening agents are advantageously derivatives of benzophenone, of benzotriazole, of naphthalene, of salicylic acid, of benzoic acid and of oxalanilide, and ketone derivatives.

The concentration of UV stabilizer in the solution (S), expressed in grams per kilo of solution, advantageously has a value of at least 1; in addition, it advantageously has a value of at most 100.

In addition to the abovementioned components, the solution (S) can optionally comprise:

at most 50, and preferably at most 35, grams of water per kilo of solution; the solution (S) often comprises water, in particular when it has been prepared according to the method (M);

at most 20, and preferably at most 10, grams of hydrogen peroxide per kilo of solution; the solution (S) often comprises hydrogen peroxide, in particular when it has been prepared according to the method (M);

at most 50, and preferably at most 20, grams of additives, such as nonionic and anionic emulsifying agents and such as dispersing agents, per kilo of solution; in a particularly preferred way, the solution (S) does not comprise such additives.

When the process according to the invention comprises a stage (E'), the latter is advantageously carried out at least 10 minutes and in a particularly preferred way at least 20 minutes after stage (E).

In addition, in some cases, it may be advantageous, between stage (E) and stage (E'), to rinse the surface of the articles, preferably with clear water. This applies in particular when the surface of the articles has been treated with a larger amount of solution (S) than desired.

The treatment in stage (E') is advantageously carried out under the same conditions and advantageously has the same characteristics, irrespective of the level of preference, as those for the treatment in stage (E)

However, stage (E') is distinguished from stage (E) by the implementational conditions and characteristics mentioned below.

The end of stage (E') is not dependent on achievement of a certain coloration, as may be the case for stage (E).

In some cases, an off-white deposit may appear at the surface of the articles a few hours after stage (B') has been carried out, This deposit can be removed without difficulty in the form of dust by rubbing the articles, dry, with a cloth or a soft paper. This has no damaging consequence for the articles.

The concentration of UV stabilizer in the solution (S'), expressed in grama per kilo of solution, advantageously has a value of at least 0.5, preferably of at least 1, in a particularly preferred way of at least 2 and in a very particularly preferred way of at least 5; in addition, it advantageously has a value of at most 250, preferably of at most 100 and in a particularly preferred way of at most 50.

The weight of UV stabilizer which is retained at the surface of or inside the articles immediately after the treatment with the solution (S') has been carried out, expressed in grams per m², advantageously has a value of at least 0.005, preferably of at least 0.05 and in a particularly preferred way of at least 0.25; in addition, it advantageously has a value of at most 50, preferably of at most 10 and in a particularly preferred way of at most 5.

The UV stabilizer which the solution (S') comprises is advantageously chosen from complexing agents, such as nickel(II) complexes and organic phosphites, sterically hindered phenols and amines, such as butylated hydroxytoluene and ethylenebispiperazinone, and UV screening agents.

Preferably, the UV stabilizer which the solution (S') comprises is chosen from UV screening agents.

The UV screening agents are advantageously derivatives of benzophenone, of benzotriazole, of naphthalene, of salicylic acid, of benzoic acid and of oxalanilide, and ketone derivatives.

Mention may be made, as examples of UV screening agents derived from benzophenone, of 2-hydroxy-4-methoxy-benzophenone, 2,2'-dihydroxy-4,4'-dimethoxybenzophenone and 2-hydroxy-4-(n-octyloxy)benzophenone.

Mention may be made, as examples of UV screening agents derived from benzotriazole, of 2-[2'-hydroxy-5-methyl-phenyl]benzotriazole and 2-[2'-hydroxy-3',5'-di(t-butyl)phenyl]benzotriazole.

Mention may be made, as examples of UV screening agents derived from naphthalene, of benzolacetomethylnaphthalene and furfurylideneacetomethylnaphthalene.

Mention may be made, as examples of UV screening agents derived from salicylic acid, of phenyl salicylate, resorcinol monobenzoate or p-(tert-butyl)phenyl salicylate.

Mention may be made, as example of UW screening agent derived from oxalanilide, of 2-ethyl-2'-ethoxyoxal-anilide.

Mention may be made, as examples of UW screening agents which are ketone derivatives, of β-methylumbelliferone and dypnone.

Substances such as hydroquinone and its diethyl and dimethyl ethers, and tri(para-chlorophenyl)stibine, are also UV screening agents.

In a particularly preferred way, the UV stabilizer which the solution (S') comprises is chosen from derivatives of benzophenone and of benzotriazole.

The organic solvent of the solution (S') advantageously corresponds, with regard to its nature, to the same characteristics, irrespective of the level of preference, as those of the organic solvent of the solution (S).

The concentration of organic solvent of the solution (S'), expressed in grams per kilo of solution, advantageously has a value of at least 700, preferably of at least 850 and in a particularly preferred way of at least 900.

In addition to the abovementioned components, the solution (S') can optionally comprise, just like the solution (S) additives such as nonionic and anionic emulsifying agents and such as dispersing agents. The total concentration of the said additives in the solution (S') advantageously has a value of at most 50 grams per kilo of solution and preferably of at most 10. In a particularly preferred way, the solution (S') does not comprise such additives.

The process according to the invention exhibits numerous advantages.

First of all, it makes it possible to restore in a lasting way the coloration of the surface of articles which have naturally surface aged. In particular, it makes it possible to restore in a lasting way the white coloration of profiles which have turned pink from being exposed under conditions of low insolation and of high humidity.

The term "to restore in a lasting way the colorations" is intended to indicate that the coloration does not change in the months, indeed even in the years, which follow the treatment.

Ipso facto, the process according to the invention avoids the replacement pure and simple of articles which have naturally surface aged, which replacement is an expensive operation and one harmful to the image of PVC.

Next, the process according to the invention is very simple to carry out, including by non-specialist personnel.

Finally, it is inexpensive. The restoration of an article requires little time. Furthermore, the cost in raw materials of the treatment solutions is low.

The alternative forms of the process according to the invention according to which the articles are treated with a solution (S) or (S') comprising a UV stabilizer are particularly advantageous; the articles restored in that way often have a noteworthy resistance to light and to heat which is better than that of the new articles.

The example which follows is intended to illustrate the invention without, however, limiting the scope thereof.

EXAMPLE

Description of the Article to be Treated

The external face of a shutter formed from profiles, made of a polymer composition comprising 100 parts of a vinyl chloride homopolymer, 6.2 parts of coated rutile titanium dioxide, 8.5 parts of a lead stabilizer and 8.7 parts of conventional additives (including 6.2 parts of calcium carbonate), has intermittently been exposed to sunlight and brought into contact with rainwater for a period of 4 consecutive years, during which the duration of the insolation has been respectively, from the first to the fourth year, approximately 1700 hours/year, 1300 hours/year, 1600 hours/year and 1400 hours/year.

The whole of the external face of the shutter, which was white when the shutter was new, has acquired a homogeneous pink coloration. The latter was measured with a Minoltac® CM-508d spectrocolorimeter; the following were obtained: $L^*=88.13$, $a^*=0.37$, $b^*=3.0$ and $PI=2.1$, $L^*$, $a^*$, $b^*$ and PI as defined above.

The interior of the same shutter, which has not been exposed to sunlight and which has not been brought into contact with rainwater, has retained a white coloration. Its coloration was measured with the same spectrocolorimeter; the following were obtained: $L^*=91.8$, $a=^*-1.11$, $b^*=-2.56$ and $PI=-2.6$, $L^*$, $a^*$, $b^*$ and PI as defined above.

In addition, the difference $\Delta E_{ab}^*$, between the coloration of the external face of the shutter and the coloration of the internal face of the shutter (which has not been exposed to sunlight or brought into contact with rainwater) was calculated; the following was obtained: $\Delta E_{ab}^*=6.8$.

Preparation of the Treatment Solutions

Preparation of the Solution (S)

The stopper of a separating funnel, which funnel is equipped with a tap at its base and with the said stopper in its top part, was removed, 375 cm$^3$ of dichloromethane and then 125 cm$^3$ of a Proxitane® 15 aqueous solution, comprising peracetic acid in a proportion of approximately 150 g/kg of solution, hydrogen peroxide in a proportion of approximately 150 g/kg of solution and acetic acid in a proportion of approximately 300 g/kg of solution, were introduced into the separating funnel.

The stopper of the separating funnel was reinserted. The separating funnel was inverted and then its tap was immediately opened. The tap was left open for approximately 10 seconds. The tap was subsequently reclosed and the separating funnel was righted.

The separating funnel was shaken manually for approximately 10 seconds. A two-phase mixture, containing an organic phase and an aqueous phase, was thus formed.

Separation by settling was allowed to take place until the organic and aqueous phases had completely separated. The denser organic phase was subsequently withdrawn via the tap situated at the base of the funnel. The organic phase constituted the solution (S).

The composition of the solution (S) was-determined. The solution (S) comprised peracetic acid in a proportion of approximately 20 g/kg of solution, acetic acid in a proportion of approximately 40 g/kg of solution, hydrogen peroxide in a proportion of approximately 1 g/kg of solution and dichloromethane in a proportion of approximately 935 g/kg.

Preparation of the Solution (S')

500 cm$^3$ of dichloromethane were introduced into a beaker and then 10 g of 2-[2'-hydroxy-3',5'-di(tert-butyl)phenyl]benzotriazole, Tinuvin® 320, were introduced therein with stirring.

Stirring was continued until the 2-[2'-hydroxy-3,'5'-di(tert-butyl)phenyl]benzotriazole had completely dissolved in the dichloromethane.

Treatment of the Article

The temperature of the ambient air at the time when the treatment was carried out was 23° C.

Cleaning

The external face of the shutter was dusted with a dry rag.

Coating with the Solution (S)

A cotton cloth was stretched over the stiff pad of a coating tool with a handle and then the cotton cloth was impregnated with the solution (S).

The cloth, impregnated with the solution (S), was rubbed over the entire external face, which had turned pink, of the shutter without applying pressure against the face, the front separating the coated surface from the uncoated surface being progressed at approximately 15 mm/s and it being ascertained that the entire external face had regained a white coloration. The cotton cloth was reimpregnated with the solution (S) each time that the decolouring action declined.

Once the coating treatment with the solution (S) was complete, there was a wait of half an hour. No stubborn stain reappeared.

The coloration of the external face of the shutter after its treatment with the solution (S) was measured with the Minolta® CM-508d colorimeter; the following were obtained: L*=91.94, a*=−0,99, b*=−2.76, PI=−2.6, L*, a*, b* and PI as defined above.

In addition, the difference $\Delta E_{ab}^*$ between the coloration of the internal face of the shutter and the coloration of the external face of the shutter after treatment with the solution (S) was calculated; the following was obtained: $\Delta E_{ab}^*=0.27$. Such a small difference in coloration was not perceptible by the human eye.

Coating with the Solution (S')

A cotton cloth was stretched over the stiff pad of a coating tool with a handle and then the cotton cloth was impregnated with the solution (S').

Half an hour after the end of the coating treatment with the solution (S) and no stubborn stain having reappeared, the cloth impregnated with the solution (S') was rubbed over the entire external face of the shutter, without applying pressure against the face, the front separating the coated surface from the uncoated surface being progressed at approximately 30 mm/s. The cotton cloth was reimpregnated with the solution (S') each time that the cloth dried up.

The coloration of the external face of the shutter after its treatment with the solution (S') was measured with the Minolta® CM-508d colorixmeter; the following were obtained: L*=92.11, a*=−1.23, b*=−2.78 and PI=−2.8, L*, a*, b* and PI as defined above.

In addition, the difference $\Delta E_{ab}^*$ between the coloration of the internal face and the coloration of the external face of the shutter after treatment with the solutions (S) and (S') was calculated; the following was obtained: $\Delta E_{ab}^*=0.4$. Such a small difference in coloration was not perceptible by the human eye.

The invention claimed is:

1. A process for the treatment of the surface of an article which has undergone a change in its coloration during use, the process comprising:
    treating said surface of the article in ambient air with a first organic solution comprising an organic peroxide and a first organic solvent, the treatment consisting of diffusing the solution into only a surface layer of the article;
    wherein the article comprises a polymer composition comprising a vinyl chloride polymer.

2. The process according to claim 1, wherein the first organic solution further comprises a UV stabilizer.

3. The process according to claim 1, wherein the process further comprises treating the surface of the article with a second organic solution, different from the first organic solution after said treating with said first organic solution, wherein the second organic solution comprises a UV stabilizer and a second organic solvent.

4. The process according to claim 1, wherein the polymer composition further comprises titanium dioxide.

5. The process according to claim 1, wherein said treating with a first organic solution consists of coating the surface of the article with the first organic solution.

6. The process according to claim 1, wherein the temperature of the ambient air is less than 40° C.

7. The process according to claim 1, wherein the first organic solvent is an agent that swells the vinyl chloride polymer.

8. The process according to claim 1, wherein first organic solvent is dichloromethane.

9. The process according to claim 1, wherein said first organic solution is sprinkled, sprayed or coated onto the surface of the article.

10. A process for the treatment of an article, the process comprising
- treating the surface of the article in ambient air with a first organic solution comprising an organic peroxide and a first organic solvent,
- wherein the article comprises a polymer composition comprising a vinyl chloride polymer, and
- wherein the organic peroxide is an organic peracid.

11. The process according to claim 10, wherein the organic peracid is peracetic acid.

12. The process according to claim 10, wherein the first organic solution further comprises an organic acid.

13. The process according to claim 12, wherein the first organic solution is prepared by a process comprising:
- mixing the first organic solvent with an aqueous solution comprising:
  - the organic peracid in a positive proportion of at most 250 g of the organic peracid/kg of the aqueous solution,
  - the organic acid in a positive proportion of at most 500 g of organic acid/kg of the aqueous solution,
  - hydrogen peroxide in a positive proportion of at most 250 g of hydrogen peroxide/kg of the aqueous solution, and
  - water until a two-phase mixture comprising an organic phase and an aqueous phase is formed;
- separating the organic phase and the aqueous phase;
- recovering the organic phase, wherein the organic phase comprises the first organic solution.

14. The process according to claim 10, wherein the polymer composition further comprises titanium dioxide.

15. The process according to claim 10, wherein the first organic solvent is an agent that swells the vinyl chloride polymer.

16. The process according to claim 10, wherein first organic solvent is dichloromethane.

17. The process according to claim 10, wherein the first organic solution further comprises a UV stabilizer.

18. The process according to claim 10, wherein the process further comprises treating the surface of the article with a second organic solution, different from the first organic solution after said treating with a first organic solution,
- wherein the second organic solution comprises a UV stabilizer and a second organic solvent.

19. The process according to claim 10, wherein said treating with a first organic solution consists of coating the surface of the article with the first organic solution.

20. The process according to claim 10, wherein the temperature of the ambient air is less than 40° C.

21. The process according to claim 10, wherein said first organic solution is sprinkled, sprayed or coated onto the surface of the article.

* * * * *